July 20, 1954

L. LEIKER 2,683,995

ELECTROMAGNETIC TRANSMISSION

Filed Jan. 15, 1951

INVENTOR.
LINUS LEIKER
BY Charles R. Werner
ATTORNEY

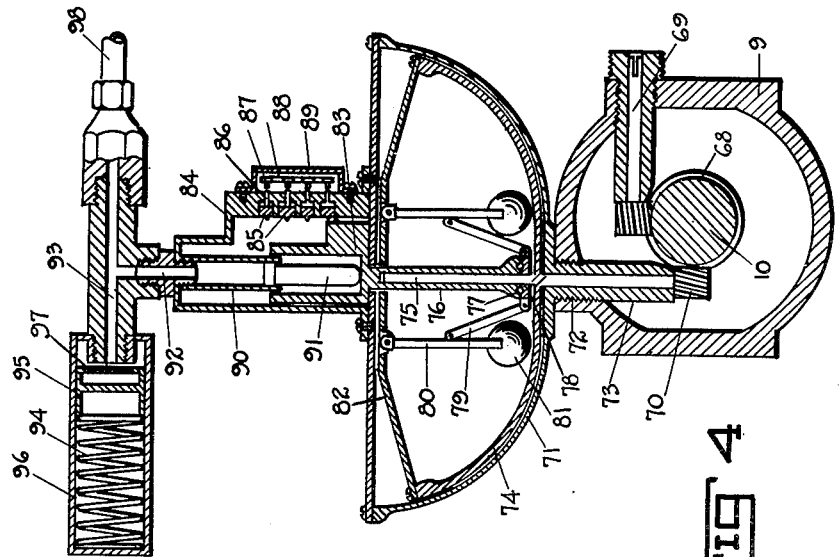

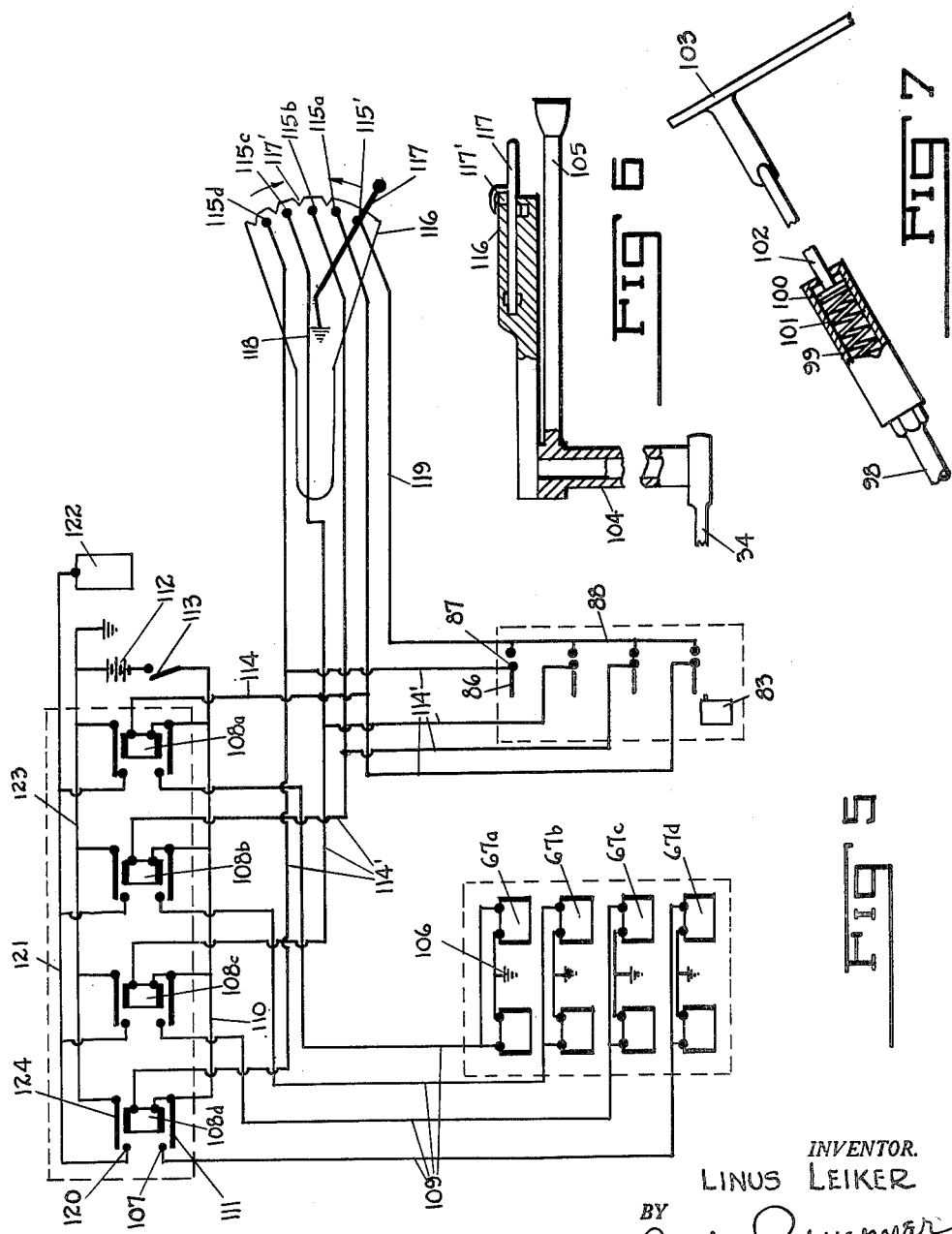

Patented July 20, 1954

2,683,995

UNITED STATES PATENT OFFICE 2,683,995

ELECTROMAGNETIC TRANSMISSION

Linus Leiker, Denver, Colo.

Application January 15, 1951, Serial No. 206,101

15 Claims. (Cl. 74—472)

This invention relates in general to an automatic transmission for motor vehicles and in particular to an electromagnetic transmission in which a sliding driven member is selectively moved from one magnetic field to another to change the gear ratio between the driving gear and the driven gear.

The invention contemplates the employment of a rotatable cluster of bevel gears, a pair of longitudinally fixed freely rotatable driving bevel gears, and a plurality of rotatable driven crown gears all in continuous mesh with the cluster of bevel gears, a forward-reverse unit slidably mounted on a driving shaft and movable from a neutral position into and out of engagement with the freely rotatable driven bevel gears, for selective forward or reverse movement, a spur gear on a slidable member longitudinally movable and rotatable with the driven shaft, the spur gear being adapted to mesh with any one of internally toothed portions of the driven crown gears, and the slidable member with the spur gear being movable to and from any one of the meshing positions by electrical selective actuation of electromagnets, said actuation being automatically governed by the speed of the vehicle or controlled manually by the vehicle operator.

Generally, fluid drive or fluid coupling is utilized when my electromagnetic transmission is employed on a passenger vehicle, the clutch not being needed, although use of a clutch is desirable on trucks and heavy vehicles.

The transmission can be mounted in its normal position in the vehicle and controls therefor will be in their normal location, that is, preferably on the steering column extending to a position adjacent the driver's right hand.

The objects of the invention are, first; to provide an electromagnetic transmission in which change of gear ratios can be obtained by progressively and individually energizing one of a plurality of electromagnets to progressively slide a gear carrying member on the driven shaft from meshing engagement with one gear to engagement with another gear.

Second; to manually control the transmission for forward, reverse and neutral positions, the various gear ratios obtainable when the transmission is in forward or reverse positions; and the transmission rendered ineffective when in neutral position.

Third; to provide a control system for my electromagnetic transmission in which automatic or manual control of the shifting of gears is accomplished.

Fourth; to provide in the manual forward-reverse control, a spring means which will snap the engaging members into and out of engaging position for rapid and positive engagement.

Fifth; to provide in the electrical control system, means for momentarily grounding the ignition circuit of the engine to slow down the engine when shifting gears.

Sixth; to provide a governor-controlled contact system in which the changing speed of the vehicle will actuate the governor to energize different contacts in the electrical system which energizes the electromagnets for automatic shifting of gears.

Seventh; to provide a hydraulic system controlled by excessive accelerator movement which will momentarily render the governor ineffective in actuating the contacts whereby rapid vehicle acceleration in a single gear ratio or speed may be obtained without changing of gear ratios until lapse of a short period of time.

Other objects and advantages, as well as the construction and operation of my invention will be apparent by reference to the following description in connection with the accompanying drawings in which:

Fig. 2 is a transverse vertical cross sectional view on the line 2—2 of Fig. 1.

Fig. 3 is a transverse vertical cross sectional view on the line 3—3 of Fig. 1.

Fig. 4 is a vertical cross sectional view taken transversely on line 4—4 of Fig. 1 showing the governor, progressive selector and fluid snubber for rapid acceleration.

Fig. 5 is a circuit diagram which includes the magnetic elements on the transmission, the progressive selector, the relays and the manual shift controls.

Fig. 6 is a fragmentary detail view of the manual controls.

Fig. 7 is a fragmentary detail of the fluid cylinder operated by the accelerator pedal for control of the transmission during rapid acceleration.

Figure 1:
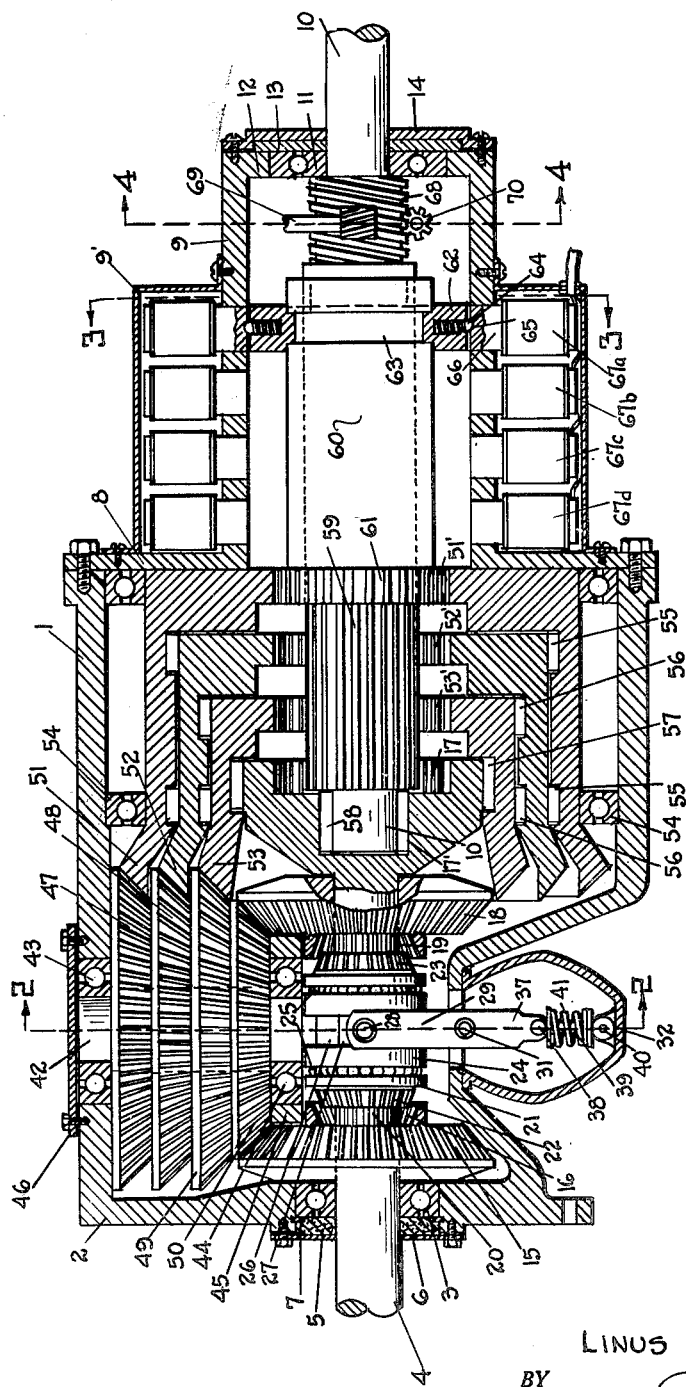
Fig. 1 is a longitudinal horizontal sectional view through the transmission, parts being shown in elevation for clarity of illustration.

Referring now to the drawings by numerals of reference, 1 designates a gear housing in end 2 of which is mounted bearing 3 carrying shaft 4 with packing 5 and packing plate 6 suitably sealing the shaft against leakage of lubricant. A recessed stop ring 7 forms an abutment against which the bearing 3 may stop.

The opposite end of the housing 1 is closed by flange 8 of magnet housing 9, shaft 10 being supported in bearing 11 mounted in end 12 of housing 9, with packing 13 and packing plate 14 maintaining a fluid tight connection about the shaft. Housing 9 is made of a nonmagnetic material such as bronze, brass, aluminum or any suitable metal or alloy whereby operation of electromagnets as hereinafter described will not be affected.

Shaft 4, which is to be driven by any suitable power sources either directly or through a clutch or fluid drive or coupling, supports freely rotatable bevel gear 15 with internal beveled gear teeth 16, the shaft 4 extending into the housing 1 and terminating in an internally threaded spur gear 17, a second freely rotatable bevel gear 18 being supported on the shaft 4 adjacent spur gear 17, the gear 18 having internal gear teeth 19.

The shaft 4, between the gears 15 and 18, is splined as at 20 for sliding reception of forward-reverse member 21 with beveled gear ends 22 and 23 adapted for selective engagement with internal gear teeth 16 and 19. A collar 24 is freely mounted on member 21 with ball bearings 25 therebetween and has an annular groove 26 for reception of yoke collar 27 to which is pivoted at 28 a yoke 29 which is secured at 30 to shaft 31, one end of which extends externally of the housing 32. (See Figs. 1 and 2.)

A lever arm 33 is carried on shaft 31 and may connect to control link 34, a fragmentary portion of which is shown and which connects to a manual control lever hereinafter described. Spring mounted ball 35 is adapted to hold the arm 33 steady by pressure in ball recesses 36, one being provided for each of forward, neutral and reverse positions.

Yoke 29 has an arm extension 37 pivoted at 38 to short pin 39 which in turn is pivotally supported on housing 32 at 40. A spring 41 is provided to snap and hold arm 37 and consequently the beveled gears 22 and 23 into engagement with internal gear teeth 16 and 19.

A transverse stub shaft 42 is mounted in bearings 43 and 44 carried by housing 1 and ring frame 45 respectively, end plate 46 sealing the shaft and bearing within the housing 1.

A cluster of bevel gears 47, 48, 49 and 50, all formed as an integral unit are secured to shaft 42 and rotatable therewith, gear 50 meshing continuously with bevel gears 15 and 18.

Crown bevel gears 51, 52 and 53 are mounted concentrically in the housing 1 about shaft 10, bearings 54 carrying gear 51 in spaced relation to the housing 1; roller bearings 55 between gears 51 and 52; roller bearings 56 between gears 52 and 53; roller bearings 57 between gear 53 and spur gear 17; and roller bearings 58 in internal recesses 17' of spur gear 17, between spur gear 17 and the shaft 10.

Shaft 10 is provided with enlarged splined portion 59 on which is slidably carried splined sleeve 60 having end pinion gear 61 adapted to mesh with internal gear portions 51', 52', 53' of crown bevel gears 51, 52, and 53, or with spur gear 17. The spacing between gear portions 51', 52', 53' and spur gear 17 is a fraction greater than the width of pinion gear 61 for the purpose hereinafter specified.

Split collar 62 engages annular groove 63 in sleeve 60, the collar 62 being of a magnetically attractive material, spring urged balls 64 being mounted in the collar and adapted to seat in depressions 65 of electromagnetic cores 66 horizontally and diametrically disposed in housing 9.

A plurality of electromagnets 67a, 67b, 67c and 67d are carried by housing 9, a cable leading from the housing cover 9' and suitably connected to other components as hereinafter explained.

A threaded portion 68 of shaft 10 drives speedometer takeoff 69 and governor takeoff 70, governor housing 71 resting on housing 9 and secured thereto by threaded portion 72 of takeoff sleeve 73. The governor, which is substantially conventional in design comprises a rotatable shell 74 with central upstanding pin 75 on which sleeve 76 is mounted. The lower end of sleeve 76 has ball bearings 77 resting on vertically movable and rotatable collar 78, links 79 pivotally connected to the collar and to arms 80 carrying ball weights 81 and pivotally hung from cover 82 of rotatable shell 74.

The upper end of sleeve 76 terminates in a contact head 83 operatively positioned within housing 84. A plurality of blocks 85 are movably positioned in housing 84, nonconductive pins 86 bearing in the blocks and urged thereagainst by spring contacts 87. A contact bar 88 is normally spaced from the contacts 87, a cover 89 surrounding the contact elements.

A downwardly projecting cylinder 90 is located within the housing 84 (see Fig. 4), a fluid tight plunger 91 being movably positioned in said cylinder and adapted to abut the lower end of housing 84 for movement coincident therewith.

Passage 92 leads from cylinder 90 to transverse passage 93, one end of which terminates in chamber 94 in which is located plunger 95, spring 96 and perforated disc 97. The other end of passage 93 leads to conduit 98 which is connected to a cylinder 99 in which piston 100 and spring 101 is carried. (See Fig. 7.)

The piston 100 is mounted on stem 102 which may be suitably connected to the accelerator pedal 103. The cylinder 99, conduit 98, chamber 94 and cylinder 90 are filled with a hydraulic fluid whereby sudden and extreme pressure on the accelerator pedal 103 will be absorbed by the plunger 95 in chamber 94 and will not be transmitted to plunger 91. Further explanation of this feature will be made hereinafter.

Control link 34 suitably connects to supported sleeve 104 (see Figs. 2 and 6) to which manual forward-reverse lever 105 is secured, said lever being movable to forward, neutral or reverse position.

In the electrical arrangement of my invention one side of each electromagnet 67a, 67b, 67c and 67d is connected to ground as at 106, the other side of each electromagnet going to contacts 107 on relays 108a, 108b, 108c and 108d through conductors 109. A common conductor 110 connects one side of all the relay coils and contact bars 111 and goes to one terminal of storage battery 112 through ignition switch 113. The contact bar 111 is normally spaced from but adapted to make connection with contact 107 when the relay coil is energized.

The other side of each relay coil is individually connected through conductors 114 to contact points 115a, 115b, 115c and 115d on a manual control bar 116, a manual speed control lever 117 grounded at 118 being movably positioned for selective and momentary engagement with any desired contact, the lever 117 sliding into one of the notches 117' after contact is made and broken. Conductors 114' lead from conductors 114 to contacts 87 in the housing 84. Conductor 119 leads from contact 115' to the contact bar 88, and when lever 117 engages contact 115' the contact bar 88 is grounded and the system is ready for automatic shifting.

Another set of contacts 120 in the relays are connected by a common conductor 121 to the ignition coil 122 of the vehicle ignition system. A common conductor 123 connects contact bars 124 on each relay to ground, said contact bars being adapted to make connection with contacts 120 when a relay is energized.

Operation

With my electromagnetic transmission installed in a motor vehicle and shaft 4 connected to the engine through a conventional clutch, fluid drive or similar device, and shaft 10 connected to the driven wheels through a differential or the like, the transmission is ready for operation.

When the motor is started, manual forward-reverse lever 105 is preferably in neutral position so that bevel gear ends 22 and 23 of forward-reverse member 21, which rotates at engine speed at all times, are clear of gear teeth 16 and 19, and bevel gears 15 and 18 will not be rotating. Collar 62 will be adjacent low speed magnet 67a so that sleeve 60 will be drawn to end position with pinion gear 61 in mesh with gear teeth 51 on low speed crown gear 51.

The governor, which will not be rotating, will have balls 81 at lowermost position with contact head 83 also in its lowermost position and none of the blocks 85 engaged to actuate contacts 87. The manual speed control lever 117 may be set for automatic operation on contact 115'.

When prepared to effect forward movement of the vehicle the manual forward-reverse lever 105 is moved to forward position, the spring 41 snapping the gear end 23 into mesh with gear teeth 19. If a clutch is used this operation is done with clutch depressed, or when fluid drive is employed the initial reaction upon gear engagement is absorbed by the fluid drive.

Increase of acceleration by movement of the accelerator 103 will cause the governor to operate by raising pin 75 which in turn will move contact head 83 upward, which will progressively push contact blocks 85 and pins 86 to individually make connection between a spring contact 87 and the contact bar 88, and as seen in Fig. 5 will complete a circuit to ground 118 through conduits 119 and manual speed lever 117, conductor 114' and 114 leading to the corresponding relay 108a, 108b, 108c, or 108d, energizing said relay through conductor 110 to storage battery 112. Bars 111 and 124 will be actuated and will make connection with contacts 107 and 120, the latter going through conductor 121 to the ignition coil and grounding same to cut the ignition current for momentarily slowing the engine during movement of the sliding gear 61 in the transmission.

Closing of contact 107 will, through conductor 109, energize one of the electromagnets 67a, 67b, 67c or 67d, the core 66 attracting the split collar 62, sliding the sleeve 60 and gear 61 horizontally to the next internal gear tooth section 52', 53' or 17. As the speed of the vehicle varies the governor will operate to select another circuit for electromagnetic change of gear ratio either higher or lower. Also, such gear change may be effected manually by desired positioning of manual speed lever 117, the gear ratio remaining constant until lever 117 is moved to another speed position, or to automatic position on contact 115'.

In the design of housing 84 with contact blocks 85 therein, the distances between said blocks 85 may be set according to the interval desired between shifting from one gear ratio to another.

In the accelerator control system shown in Figs. 4 and 7, a sudden and extensive downward movement on the accelerator will force plunger 100 against the fluid in the cylinder 99 and conduit 98, causing pressure against plunger 91 which bears against the bottom of contact head 83. This fluid pressure initially will be sufficiently great to prevent the governor action from moving the contact head 83 upward. However, as the fluid passes through perforated plate 97 and against plunger 95 and overcomes the spring 96, governor action will begin and the automatic electromagnetic gear shifting will commence. The action will be smooth and steady without any abrupt or jerky movements.

To reverse the direction of movement of the vehicle it is merely necessary to move the manual forward-reverse lever to reverse position. Bevel gear 23 will snap out of engagement with gear teeth 19 and bevel gear 22 will snap into engagement with gear teeth 16. Although usually not necessary, the same four speeds forward are available in reverse and automatic shifting or manual shifting is operable the same as in forward movement.

The gears within the housing may operate in a bath of lubricant which will provide for long life and quiet operation.

From the foregoing it will be apparent that I have provided an electromagnetic transmission for vehicles which will be fully automatic insofar as gear change shifting is concerned, the shifting being accomplished as the speed of movement of the vehicle over the ground changes, by governor control of electrical contacts connected to a plurality of electromagnets in the field of which operates a sliding gear movable into mesh with any one of a plurality of different speed ratio gears.

My electromagnetic transmission will operate with equal efficiency on any vehicle or stationary power driven equipment where change of speed is necessary.

It is obvious that changes in form, proportion and details of construction may be resorted to without departing from the spirit of my invention and I reserve the right to all changes which come within the scope of these specifications and the claims which follow.

What I claim as new and desire to secure by Letters Patent is:

1. An electromagnetic transmission comprising a driving member, a driven member, a plurality of intermediate members of predetermined diameters operatively positioned between the driven member and the driving member, electromagnetic means selectively interconnecting the driving and driven members through any combination of the intermediate members for variable speed of rotation of the driven member, a governor speed control actuated by the driven member and actuating the electromagnetic means whereby selection of an intermediate member will be related to the speed of rotative movement of the driven member, and governor retarding means including accelerator actuated means fluidly connected to said governor speed control, movement of the accelerator actuated means preventing excessively rapid speed changes by the governor speed control upon rapid and excessive movement of the accelerator.

2. An electromagnetic transmission comprising a driving member, a driven member, a plurality of intermediate members of predetermined diameters operatively positioned between the driven member and the driving member, electromagnetic means selectively interconnecting the driving and driven members through any combination of the intermediate members for variable speed of rotation of the driven member, a governor speed control actuated by the driven member and actuating the electromagnetic means whereby selection of an intermediate member will be related to the speed of rotative movement of the driven member, and governor retarding means responsive to movement of the accelerator actuated means to prevent excessively rapid speed changes by the governor speed control upon rapid and excessive movement of the accelerator, said governor retarding means comprising a fluid filled system, a fluid cylinder and plunger in the system and actuated by movement of the accelerator, a second fluid cylinder and plunger in the system movable with the governor speed control and retarding the movement thereof upon rapid and excessive movement of the accelerator, and a third fluid cylinder and plunger in the system interconnected with the first two mentioned fluid cylinders and plungers and adapted to receive fluid under pressure from the system upon excessive and rapid movement of the accelerator.

3. An electromagnetic transmission comprising a driving member, a driven member, a plurality of intermediate members of predetermined diameters operatively positioned between the driven member and the driving member, and electromagnetic means concentric with the driven member and including longitudinally slidable means selectively interconnecting the driving and driven members through any combination of the intermediate members for variable speed of rotation of the driven member, and a forward-reverse means between the driving member and the intermediate members.

4. An electromagnetic transmission comprising a driving member, a driven member, a plurality of intermediate members of predetermined diameters operatively positioned between the driving and the driven members, a slidable selector member carried by and concentric with the driven member and arranged for selective individual engagement with any combination of the intermediate members, and electromagnetic means concentric with and adapted to move the slidable selector member longitudinally on the driven member.

5. An electromagnetic transmission comprising a driving member, a driven member, a plurality of intermediate members of predetermined diameters operatively positioned between the driving and the driven members, a slidable selector member carried by and concentric with the driven member and arranged for selective individual engagement with any combination of the intermediate members or directly to the driving member, and electromagnetic means concentric with and adapted to move the slidable selector member longitudinally on the driven member.

6. An electromagnetic transmission comprising a driving member, a pair of spaced idling gears on the driving member, a slidable gear rotatable with the driving member normally disengaged from but adapted for engagement with either of the idling gears, a driven member, a plurality of axially aligned gears concentrically arranged about the driven member and normally disengaged therefrom, intermediate members between some of the axially aligned gears and the idling gears, a slidable selector gear on the driven member, and electromagnetic means concentric with and adapted to move the slidable selector gear into engagement with any one of the axially aligned gears.

7. An electromagnetic transmission comprising a driving member, a pair of spaced idling gears on the driving member, a slidable gear rotatable with the driving member normally disengaged from but adapted for engagement with either of the idling gears, a driven member, a plurality of axially aligned gears concentrically arranged about the driven member and normally disengaged therefrom, one of said last mentioned gears being carried by and rotatable with the driving member, intermediate members between some of the axially aligned gears and the idling gears, a slidable selector gear on the driven member, and electromagnetic means concentric with and adapted to move the slidable selector gear into engagement with any one of the axially aligned gears.

8. An electromagnetic transmission comprising a driving member, a driven member in axial alignment with the driving member, a pair of spaced idling gears on the driving member, a slidable gear concentric and rotatable with the driving member, said slidable gear being normally disengaged from but adapted for engagement with either of the idling gears for forward or reverse movement of the driven member, an intermediate gear in continuous mesh with both of the idling gears, a gear cluster rotatable with the intermediate gear, a plurality of axially aligned crown gears concentrically arranged about the driven member and normally disengaged therefrom, each crown gear being of a different outside diameter and meshing with one of the gears in the gear cluster, a slidable selector gear on the driven member adapted to mesh internally with one of the crown gears, and electromagnetic means concentric with and adapted to move the slidable selector gear into selective crown gear engaging position.

9. An electromagnetic transmission comprising a driving member, a driven member in axial alignment with the driving member, a pair of spaced idling gears on the driving member, a slidable gear concentric and rotatable with the driving member, said slidable gear being normally disengaged from but adapted for engagement with either of the idling gears for forward or reverse movement of the driven member, an intermediate gear in continuous mesh with both of the idling gears, a gear cluster rotatable with the intermediate gear, a plurality of axially aligned crown gears concentrically arranged about the driven member and normally disengaged therefrom, each crown gear being of a different outside diameter and meshing with one of the gears in the gear cluster, a gear carried at one end of the driving member and aligned with the axially aligned crown gears, a slidable selector gear on the driven member adapted to mesh internally with one of the crown gears or with the gear on the end of the driving member, and electromagnetic means concentric with and adapted to move the slidable selector gear into selective crown gear engaging position or into engagement with the gear on the end of the driving member.

10. The structure as specified in claim 8, including internal gear teeth on the crown gears, the longitudinal spacing between the internal gear teeth on each crown gear being greater than the width of the gear teeth on the slidable selector gear.

11. The structure as specified in claim 5, said electromagnetic means including a plurality of electromagnets aligned along the driven member and in concentric operating relation to the slidable selector member, a speed controlled multiple selective contact means actuated by the driven member, relays having contacts connecting each electromagnet to a current source, said relays having additional contacts momentarily grounding the ignition system of the driving member upon actuation of the relays, the selective contact means actuating the relays individually and progressively as the speed of the driven member changes to actuate the electromagnets individually and progressively by moving the slidable selector member.

12. An electromagnetic transmission comprising a driving member, a driven member, a plurality of intermediate members of predetermined diameters operatively positioned between the driving and the driven members, a slidable selector member carried by and concentric with the driven member and arranged for selective individual engagement with any combination of the intermediate members or directly to the driving member, and electromagnetic means concentric with and adapted to move the slidable selector member longitudinally on the driven member, said electromagnetic means including a plurality of electromagnets aligned along opposite sides of the driven member, a collar of magnetically attractable material on the slidable selector member and in the magnetic field of the electromagnets, the electromagnets being carried in a housing of a nonferrous material.

13. An electromagnetic transmission comprising a driving member, a driven member in axial alignment with the driving member, a pair of spaced idling gears on the driving member, a slidable gear concentric and rotatable with the driving member, said slidable gear being normally disengaged from but adapted for engagement with either of the idling gears for forward or reverse movement of the driven member, an intermediate gear in continuous mesh with both of the idling gears, a gear cluster rotatable with the intermediate gear, a plurality of axially aligned crown gears concentrically arranged about the driven member and normally disengaged therefrom, each crown gear being of a different outside diameter and meshing with one of the gears in the gear cluster, a gear carried at one end of the driving member and aligned with the axially aligned crown gears, a slidable selector gear on the driven member adapted to mesh internally with one of the crown gears or with the gear on the end of the driving member, and electromagnetic means concentric with and adapted to move the slidable selector gear into selective crown gear engaging position or into engagement with the gear on the end of the driving member, internal gear teeth on the crown gears and the gear on the end of the driving member, the longitudinal spacing between the internal gear teeth of said last mentioned gears being greater than the width of the gear teeth on the slidable selector gear.

14. An electromagnetic transmission comprising a driving member, a driven member, a plurality of intermediate members of predetermined diameters operatively positioned between the driving and the driven members, a slidable selector member carried by and concentric with the driven member and arranged for selective individual engagement with any combination of the intermediate members or directly to the driving member, and electromagnetic means concentric with and adapted to move the slidable selector member longitudinally on the driven member, said electromagnetic means including a plurality of electromagnets aligned along the driven member and in concentric operating relation to the slidable selector member, a speed controlled multiple selective contact means actuated by the driven member, relays having contacts connecting each electromagnet to a current source, said relays having additional contacts momentarily grounding the ignition system of the driving member upon actuation of the relays, the selective contact means actuating the relays individually and progressively as the speed of the driven member changes to actuate the electromagnets individually and progressively by moving the slidable selector member, and manual means for actuating any desired electromagnet for maintaining the transmission in any one definite speed ratio and rendering ineffective the speed controlled multiple selective contact means.

15. An electromagnetic transmission comprising a driving member, a driven member, a plurality of intermediate members of predetermined diameters operatively positioned between the driving and the driven members, a slidable selector member carried by and concentric with the driven member and arranged for selective individual engagement with any combination of the intermediate members or directly to the driving member, electromagnetic means concentric with and adapted to move the slidable selector member longitudinally on the driven member, said electromagnetic means including a plurality of electromagnets linearly arranged along the slidable selector member, and a magnetically attractable member on the slidable selector member and in the magnetic field of the electromagnets.

References Cited in the file of this patent

UNITED STATES PATENTS

| Number | Name | Date |
|---|---|---|
| 1,191,290 | Dillon | July 18, 1916 |
| 1,241,924 | Cole | Oct. 2, 1917 |
| 1,470,961 | Creveling | Oct. 16, 1923 |
| 2,120,104 | Livermore | June 7, 1938 |
| 2,182,438 | Kahn | Dec. 5, 1939 |
| 2,236,746 | Bush | Apr. 1, 1941 |